United States Patent
Grimmel

(10) Patent No.: US 9,604,161 B2
(45) Date of Patent: Mar. 28, 2017

(54) RAKE SYSTEM

(71) Applicant: Werkstoff + Funktion Grimmel Wassertechnik GmbH, Ober-Moerlen (DE)

(72) Inventor: Olaf Grimmel, Ober-Moerlen (DE)

(73) Assignee: Werkstoff + Funktion Grimmel Wassertechnik GmbH, Ober-Moerlen (DE)

( * ) Notice: Subject to any disclaimer, the term of this patent is extended or adjusted under 35 U.S.C. 154(b) by 132 days.

(21) Appl. No.: 14/706,731

(22) Filed: May 7, 2015

(65) Prior Publication Data

US 2015/0321126 A1  Nov. 12, 2015

(30) Foreign Application Priority Data

May 8, 2014  (DE) .................. 10 2014 006 626

(51) Int. Cl.
  *B01D 29/64*  (2006.01)
  *E02B 8/02*  (2006.01)
  *E03F 5/14*  (2006.01)
  *B62M 3/06*  (2006.01)

(52) U.S. Cl.
  CPC .......... *B01D 29/6469* (2013.01); *E02B 8/026* (2013.01); *E03F 5/14* (2013.01)

(58) Field of Classification Search
  CPC ................... E03F 5/14; B62M 3/06
  See application file for complete search history.

(56) References Cited

FOREIGN PATENT DOCUMENTS

| DE | 7324966 | 11/1973 |
|---|---|---|
| DE | 2 309 479 A1 | 8/1974 |
| DE | 195 09 738 A1 | 9/1996 |
| DE | 21 2004 000 029 U1 | 3/2006 |
| FR | 639 303 A | 6/1928 |
| FR | 2 693 217 A1 | 1/1994 |
| GB | 1 218 934 | 1/1971 |

OTHER PUBLICATIONS

German Search Report dated Jan. 23, 2015, with English translation (fifteen (15) pages).
European Search Report issued in counterpart European Application No. 15001247.4 dated Sep. 2, 2015 with English-language translation (six (6) pages).

*Primary Examiner* — Krishnan S Menon
*Assistant Examiner* — Ryan B Huang
(74) *Attorney, Agent, or Firm* — Crowell & Moring LLP

(57) ABSTRACT

In a rake system, a reamer element is attached to a reamer arm, which is movable backward and forward. A pivot axle of the reamer arm is formed on the distal end of a control arm, which is pivotable around a further pivot axle. During forward movement of the reamer arm, the reamer element pushes raked material collected by the rake to a discharge edge at the upper end of the rake. During backward movement of the reamer arm, the control arm is lifted, and the reamer element is moved back at a distance from the rake.

10 Claims, 4 Drawing Sheets

RAKE SYSTEM

This application claims priority under 35 U.S.C. §119 to prior German Application 10 2014 006 626.6, filed May 8, 2014, the entire disclosure of which is incorporated herein by reference as non-essential subject matter.

BACKGROUND OF THE INVENTION

The present invention relates to a rake system with a rake to be arranged at an angle in a channel, and a reamer which, for conveying the raked material to a discharge edge, has a reamer arm suspended in a swinging manner around an axle above the rake and which is displaceable in a backward and forward movement along the rake by means of a first actuating device. The reamer arm has a reamer element at its distal end which faces the rake, wherein means are provided which cause the reamer element to run on the rake during the forward movement and to run at a distance from the rake during the backward movement.

Such rake systems have the purpose, e.g., of cleaning water, prior to flowing toward a purification plant, from coarse and fine materials. In addition, applications in industrial product areas for removing solid materials from liquid media are known. Coarse and fine materials—the raked material—collect in front of the rake which is arranged in the channel; as a result, the rake needs to be cleaned from time to time. For such purpose, a reamer element (or a plurality of reamer elements successively) is pushed from bottom to top across the rake to a discharge edge, where the materials accumulated in front of the reamer element fall into a container for removal or a further transport unit.

One known rake system is described in German application DE 195 09 738 A1. A broad reamer element is located on the distal end of a reamer arm which is set into a back and forth motion by a hydraulic element.

During the forward movement, the reamer element bears against the rake, thus pushing the raked material toward the discharge edge.

During the backward movement, the arm is guided onto a track which removes the reamer element from the rake. For that purpose, a foldable swivel part is located on the upper end of the track which, during the forward movement of the reamer arm, is lifted from below by a journal protruding from the reamer arm, and which, during the backward movement, serves as ramp by means of which the journal is guided onto the track, thus removing the reamer arm from the rake.

Therefore, the swivel bearing at the proximal end of the reamer arm is guided in a link that substantially runs perpendicularly to the rake.

SUMMARY OF THE INVENTION

By and large, this arrangement has proven to be successful. However, the structure is relatively elaborate since both a link for the swivel bearing and a track with a swivel part has to be installed.

Therefore, the invention addresses the problem of providing an arrangement that is compact and easy to mount and maintain.

For solving the problem, the invention provides for the reamer arm to be suspended on the distal end of a control arm which is pivotably mounted on its proximal end and, for swiveling the control arm, a second actuating device at least at times engages at the control arm, wherein the actuating devices are coupled with one another such that the movements of control arm and reamer arm are synchronized, and wherein the second actuating device does not engage with the control arm during the forward movement of the reamer arm.

Therefore, instead of the link guide according to the aforementioned German application DE 195 09 738 A1 for the swivel bearing of the reamer arm, a control arm is provided which executes a delimited pivotable movement and thus moves the pivot axle for the reamer arm, formed on distal end of the control arm, substantially perpendicularly with regard to the rake plane.

In order to remove the reamer arm from the rake during the backward movement, a second actuating device is provided, which directly engages on the control arm and pivots said control arm such that the distal end of the control arm moves away from the rake.

For that purpose, the two actuating devices are coupled with one another such that the movements of control arm and reamer arm are synchronized, wherein it is essential that there is no fixed coupling between the second actuating device and the control arm, but instead, the actuating device can detach itself from the control arm, thus not be engaged with it, when during the forward movement of the reamer arm, said reamer arm is moved over the rake. As a result, the reamer element rests freely on the rake and is loaded by the weight of the control arm and the reamer arm, thus preventing the raked material from slipping under the reamer element.

Since the perpendicular position of the reamer element is not influenced by the second actuating device during the forward movement, a possible wear of the reamer element is also automatically compensated. A repair of the reamer element or its readjustment is thus not necessary.

Furthermore, the use of a track as well as a link—as provided in the prior art—can be foregone, which reduces maintenance costs.

Preferably, both actuating devices are motor-driven, wherein also a common motor can be provided particularly due to the required synchronicity.

As a first actuating device, a crank axle is preferably provided, which is connected to the reamer arm by means of a tension element which is eccentrically mounted on the crank axle. The tension element can be a tension rod or optionally also a tension chain.

The reamer arm is thus driven by means of a crank gear which is extremely maintenance-free.

For the realization of the second actuating device, a cantilever is provided, which protrudes from the crank axle and which can be borne against the control arm with its distal end.

Instead of the cantilever, a cam disk can also be attached to the crank axle, the edge of such cam disk forming a control cam, wherein the control arm has a contact element which can be borne against the control cam.

Since both actuating devices are driven by a common crank axle, the desired synchronization is automatically achieved.

Since the distal end of the cantilever merely bears against the control arm in order to lift said control arm, it also detaches itself from said control arm, once the cantilever moves into an angle range of the crank axle which lies on the side of the crank axle which lies opposite of the control arm.

In order to achieve a compact structure, the pivot axle of the control arm is located approximately above the upper end of the rake and extends in horizontal direction over the rake, and the crank axle is located below the control arm and, as seen looking in the direction of the forward movement, behind the reamer arm.

It is thus possible to accommodate the pivot axle for the control arm within a housing, which is short, with regard to the extension of the rake; said housing may possibly only be supported against tilting by means of a cantilever.

Preferably, the pivot axle is located in a housing which consists of two sides extending parallel to the arms and which is positioned above the upper end of the rake by means of height-adjustable supports.

The height-adjustable supports allow for the construction of the housing and the pivot axle in standard size, wherein the supports are adjusted to the local condition, particularly to the depth of the channel, by means of a height-adjustment of the housing.

In addition, a slider can be accommodated in the housing, by means of which the raked material accumulating at the reamer element can be pushed in the direction of the discharge edge. The slider is held on a short swivel arm, which optionally consists of two parallel struts, the bearing of which is located approximately above the upper end of the rake. Shortly before the discharge edge, the reamer element runs against the slider which is taken along and, at a further movement of the reamer element toward the discharge edge, moves in the direction of the distal end of the reamer element.

The crank axle is preferably arranged by an electric motor above a transmission. For that purpose, a motor-transmission unit is attached to the side of the housing, where it is easily reached for maintenance purposes.

In the described embodiment of the arrangement for reaming the rake, the upper end of the rake can be connected without interruption to a semi-cylindrical receiving groove having a closed floor, said receiving groove containing a screw conveyor. The interruption-free transition forms a discharge edge for the raked material and an overflow edge for the press water generated in the receiving groove by the screw conveyor.

Press water is generated when the screw conveyor transports the raked material to one end of the receiving groove while pressing said raked material together in the process. According to the prior art, the receiving groove had openings in its floor, from which the water emerged in a drainage channel. Thanks to the henceforth proposed embodiment of the receiving groove with a closed floor, the drainage channel can now be foregone, since the press water can flow back over the overflow edge to the channel receiving the rake.

In the following, the invention shall be explained in further detail using an embodiment.

DETAILED DESCRIPTION OF THE INVENTION

Figure 1A:
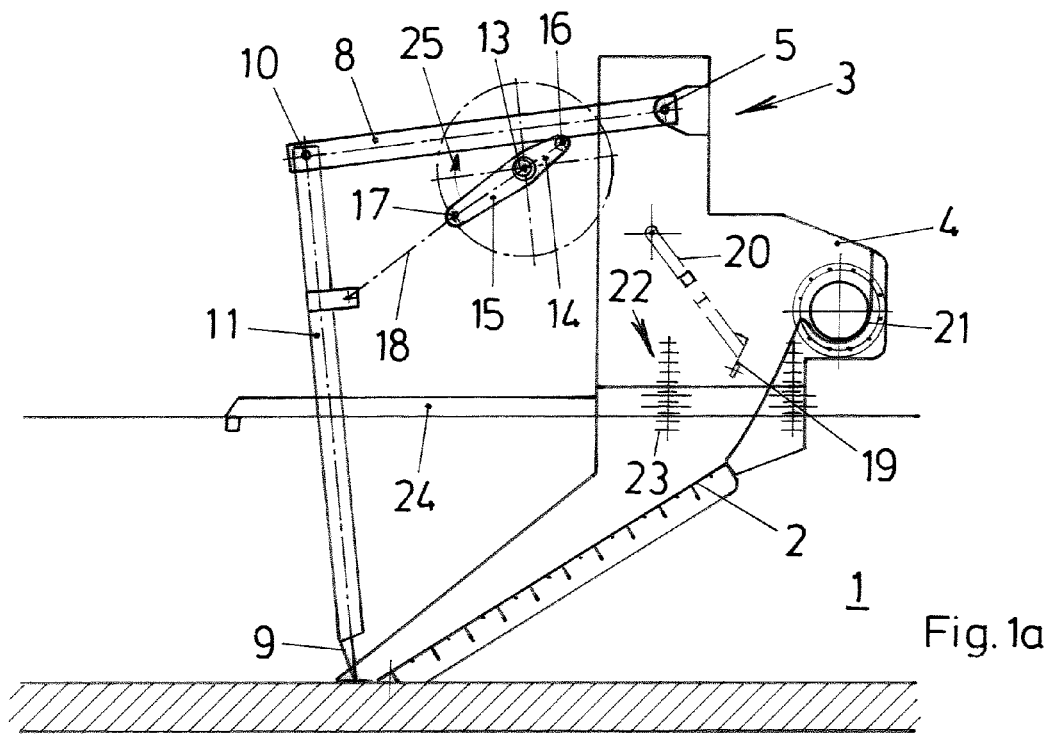
FIGS. 1a-1d show a side view of the rake system in various phases of the movement sequence of its reamer.

Reference is first made to FIG. 1.

A rake 2 (also called rake grid) is positioned in a water-bearing channel 1, said rake 2 running obliquely from bottom to top in the flow direction of the water and extending over the entire width of the channel 1. The angle created by the rake 2 and the floor of the channel 1 is between 10° and 45°.

Above the upper end of the rake 2, a housing 3 is located which consists of two sides 4 positioned on both sides of the channel 1 and connected to one another with cross connections not depicted in detail. For the purpose of simplification, the front side is not depicted.

In the upper part of the housing 3, a pivot axle 5 is located, on which the proximal end of a control arm 8, which consists of two tracks 6, 7 (see FIG. 2), is pivotably mounted, said control arm 8 extending substantially horizontally and in the direction toward the front end of the rake 2. There, on its distal end, a further pivot axle 10 for a reamer arm 11, which consists either of a track or a pipe, is arranged, said reamer arm 11 extending in the direction toward the rake 2 and, on its lower distal end, carrying a reamer element 9 with the width of the rake 2.

The rake 2 can consist of a plurality of parallel flat bars, all having a rectangular cross-section, or be formed by a so-called slot grid, in which the rake bars have a quasi triangular cross-section and are arranged such that one side each of the triangle faces the intake. As a result, the slots between the bars are widening in the direction toward the drain. The widening of the slots prevents solid components of the raked material to become stuck in the slot.

In the first case, the reamer element 9 should consist of a comb, the prongs of which engage in the gaps between the flat bars. In the second case, one reamer element 9 with a flat reamer edge suffices, said edge sweeping over the sides of the triangular bars facing the intake.

Below the control arm 8 and, as seen looking in the flow direction of the water, behind the reamer arm 11, a crank axle 13 is located, from which two cantilevers 14, 15 protrude in opposite direction from the end facing away from its drive, thus forming a double crank. On the shorter cantilever 14, a lift-out roller 16 is positioned laterally protruding on the distal end, and which, during the rotational movement of the crank axle 13, can be borne against the tracks 6 of the control arm 8, and which is located on the drive side of the double crank. At the end of the longer cantilever 15, a laterally protruding pin 17 is located for the positioning of a tension element in the form of a tension rod 18 which is connected to the reamer arm 11, and which, for reasons of clarity, is depicted only by means of a dot-dashed line.

When the geometry of the arrangement is designed such that even in the lower position of the reamer arm 11, in which the reamer element 9 is located on the bottom of the rake 2, said reamer arm 11 is not yet aligned completely perpendicularly, a tension chain can be provided instead of a tension rod 18 because said chain remains tensile loaded during the entire back and forth movement.

Furthermore, a slider 19 on a pivotably held slider arm 20 is arranged in the housing 3, said slider arm 20 consisting of two parallel struts. The pivot axle of the slider arm 20 is located approximately below the pivot axle 5 for the control arm 8. The housing 3 also contains a perpendicularly extending receiving groove 21, in which runs a screw conveyor or other conveying device, with which the raked material dropped over the discharge edge is transported to a raked material press.

The housing 3 has height-adjustable supports 22, indicated by multiple receiving bores 23 which are arranged one above the other.

In addition, a cantilever 24, extending in horizontal direction toward the front end of the rake 2, is located on the housing 3.

As can be seen in the drawings of FIGS. 1a-d, the crank axle 13 is moved clock-wise (see arrow 25 on the longer cantilever).

Figure 1B:
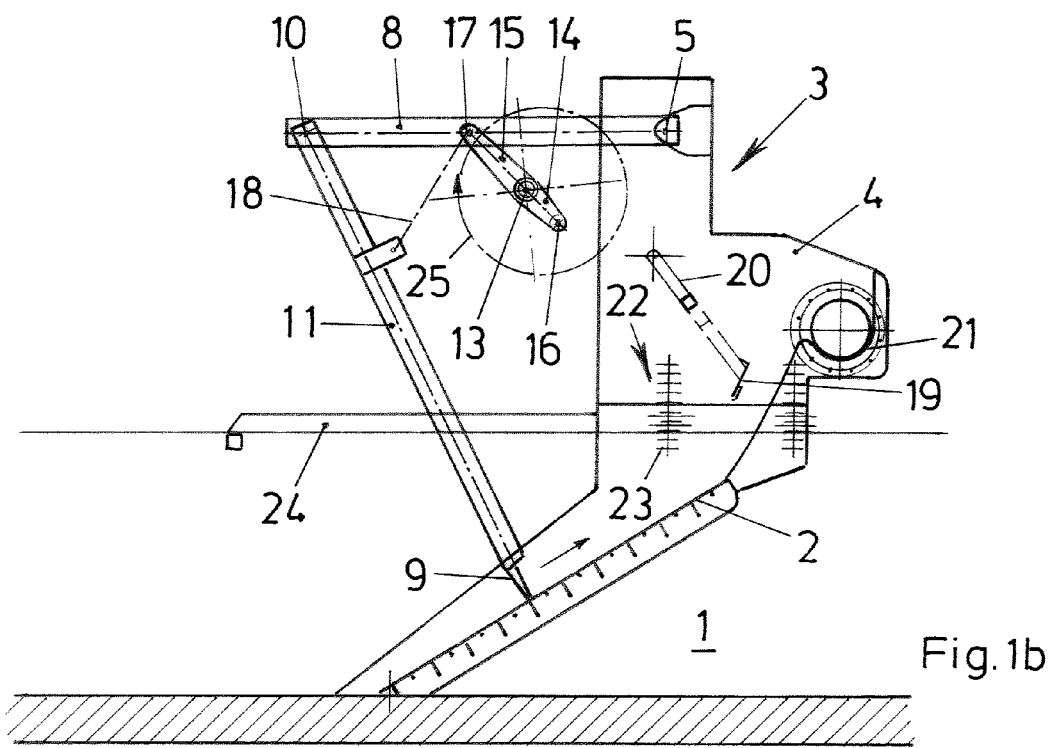

According to the depiction of FIG. 1a, the lift-out roller 16 barely bears against the control arm 8 but will move away from it after a further rotation of the crank axle 13 in the direction indicated by the arrow 25, and so the control arm 8 is no longer engaged with the lift-out roller 16. The longer cantilever 15 with the pin 17 for the tension rod 18 is located closest to the distal end of the control arm 8, and so the reamer element 9 is moved during the following rotational movement of the crank axle 13 from the foot of the rake 2 in the direction of the upper edge of the rake 2, wherein the reamer element 9 contacts the rake 1 and rests on said rake—due to the weight of the reamer and control arm—and thereby taking along the accumulated raked material to the discharge edge. This reamer movement is shown in FIG. 1b, whereby the longer cantilever 15 moves between and through the two tracks 6, 7 of the control arm 8.

Figure 1C:
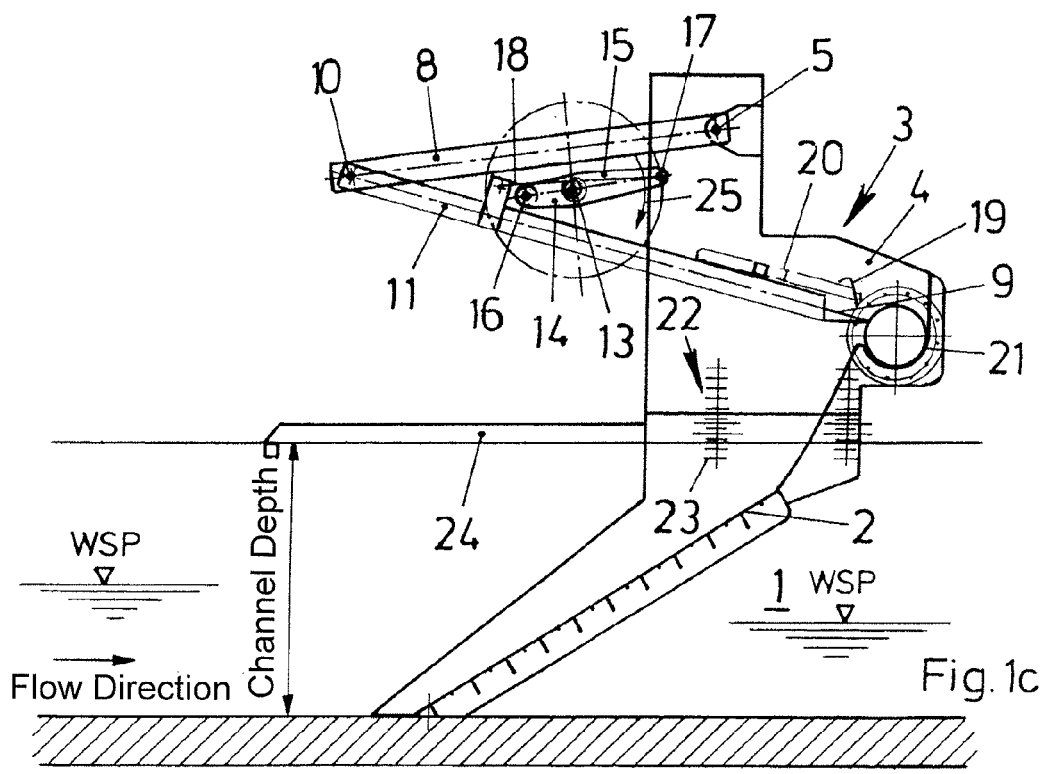

According to FIG. 1c, the longer cantilever 15 points away from the pivot axle 10 of the reamer arm 11, and so the reamer element 9 is located at the discharge edge and drops the collected raked material into the receiving groove 21. It is supported by the slider 19 which is taken along during the final phase of the reamer movement by the reamer arm 11 and thereby moves in the direction of the distal end of the reamer arm 11 to the lower edge of the reamer element 9 in order to push the raked material collected by the reamer element 9 into the receiving groove 21. Instead of the slider 19 or in addition, a spray device can be provided, the water nozzles of which are pointed toward the discharge edge and which are activated when the reamer element has reached the discharge edge.

Figure 1D:
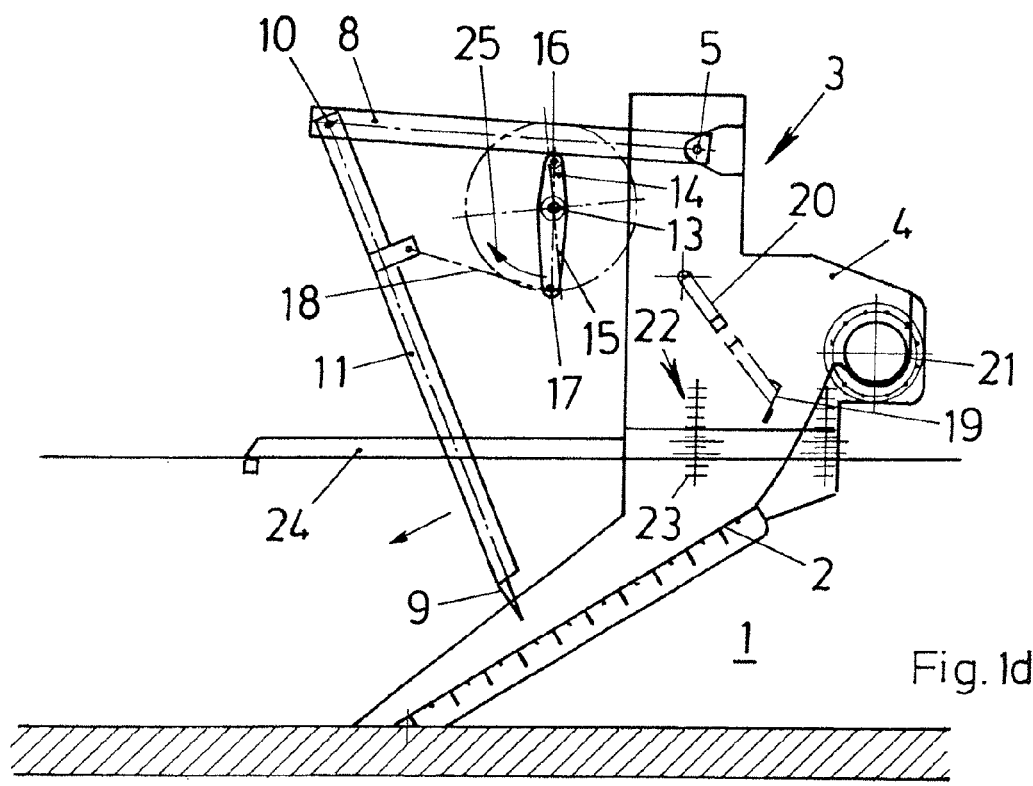

FIG. 1d shows the backward movement of the reamer arm 11, whereby the lift-out roller 16 bears against the control arm 8 and lifts said control arm 8, and so the pivot axle 10 of the reamer arm 11 is moved away from the rake 2 such that the reamer element 9 does not contact the rake 2. Only when, as already described in FIG. 1a, the lift-out roller 16 once again moves away from the control arm 8, the reamer element 9 places itself once again on the rake 2.

The described movement can be carried out continuously or be triggered, if necessary. It ensures that the rake 2 does not become clogged with materials from the water flowing through the rake 2 and a sufficient rake flow is constantly provided.

The double crank can also turn the other way around, wherein, in principle, the same movement sequences of the reamer arm 11 take place, as described above. It is crucial in both cases that, during reaming of the rake 2, the control arm 8 is not lifted by the double crank, and so the reamer element 9, resting on the rake 2, is moved from bottom to top and thereby avoids possible obstacles by moving upward. During the reset movement, the control arm 8 is lifted, and so the reamer element 9, at a distance from the rake 2, is moved back to the starting point at the foot of the rake 2.

Furthermore, the lift-out roller 16 and the pin 17 for the tension rod 18 on the crank do not necessarily have to exactly face one another. For an adjustment to the preexisting installation situation, it may be necessary that the angle created by the appropriate connecting line of the lift-out roller 16 and the pin 17 to the rotating axis of the crank can also be less than 180° or even less than 90°.

Figure 2:
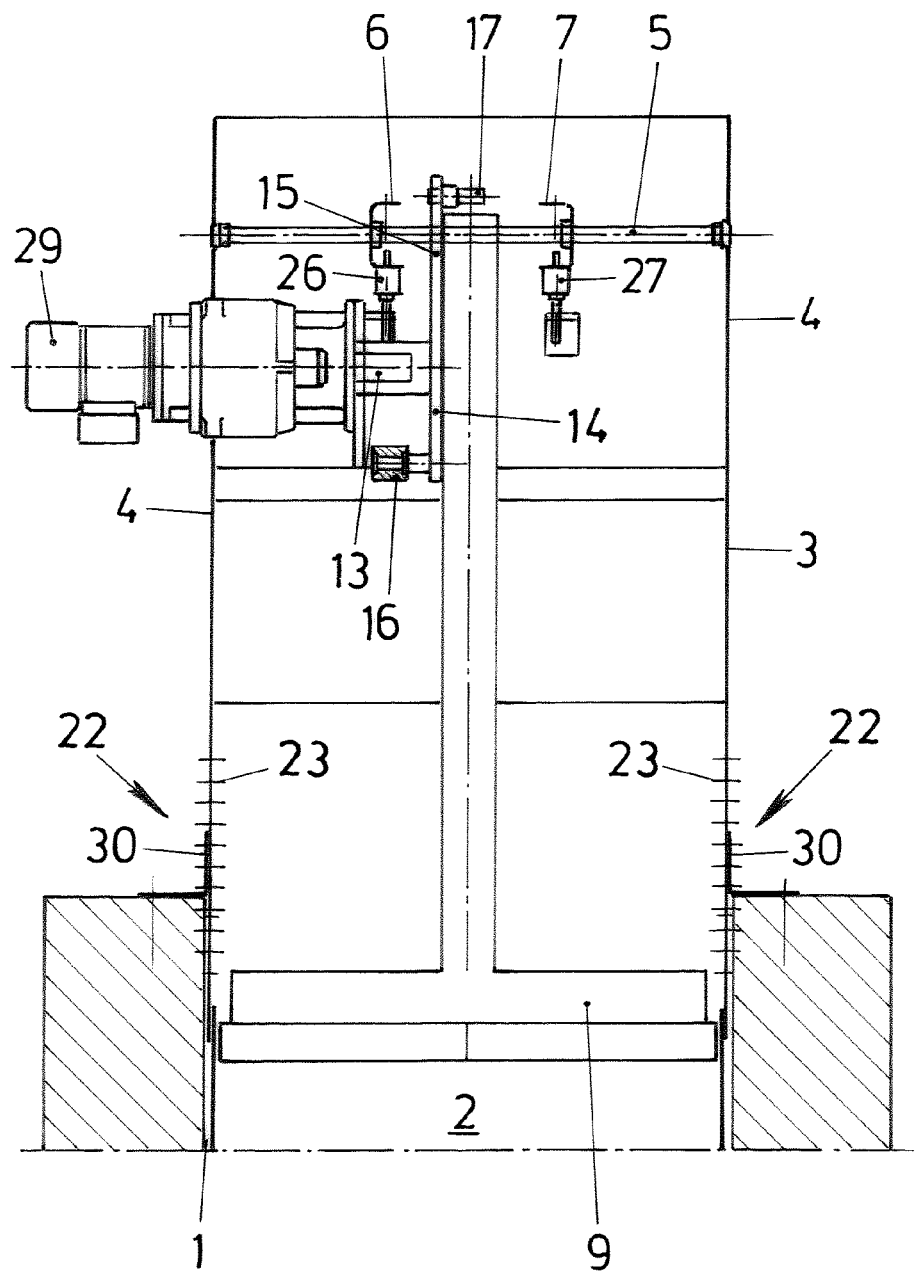
FIG. 2 shows a view of the rake system perpendicular to the movement plane of the arms of the reamer.

FIG. 2 shows a view of the rake system according to the cross-section in FIG. 1d.

The control arm 8 consists—as already described—of two tracks 6, 7 which rest on two dampers 26, 27 in order to define the lowest position of the control arm 8.

Below the control arm 8, the crank axle 13 is located with two cantilevers 14, 15 protruding from its end. The one longer cantilever 15 has the aforementioned pin 17 for the tension rod 18 which protrudes from the side of the cantilever 15 which faces away from the crank axle 13, and on its course moves between and through the two tracks 6, 7.

The shorter cantilever has the already mentioned lift-out roller 16, which protrudes laterally toward the crank axle 13, and which can bear against the track 6 of the control arm 8 which extends over the crank axle 13. The pivot axle 5 for the control arm 8 is located between the two sides 4 of the housing 3, in the side which is faced by the crank axle 13 or outside the housing 3. A motor-transmission unit 29 for driving the crank axle 13 is located in front of said side.

The housing 3 is placed onto the side walls which delimit the channel 1, wherein support angles 30 are screwed into prepared receiving bores 23, and so the penetration depth of the reamer arm 11 into the channel 1 can be adjusted to the predetermined height of the channel 1.

Figure 3:
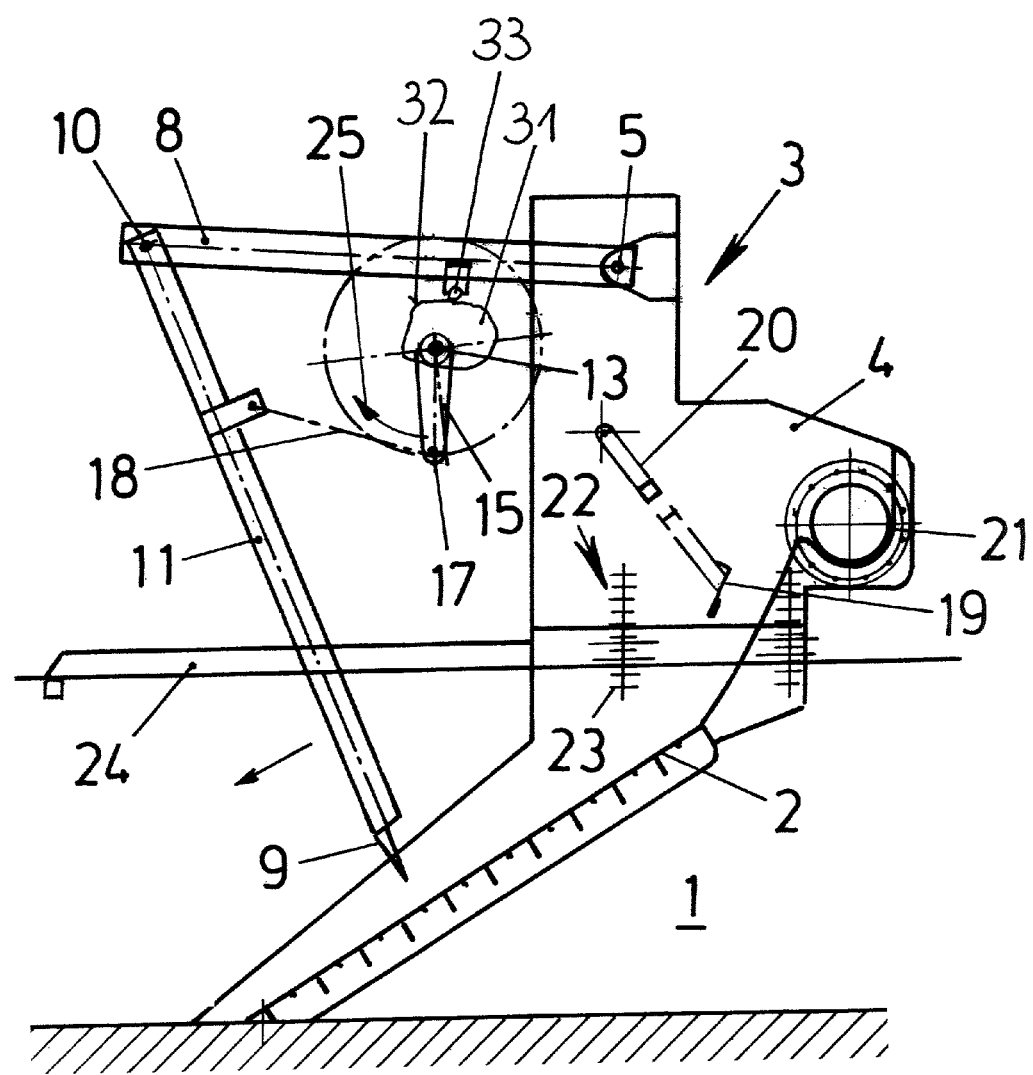
FIG. 3 shows a side view of the rake system according to FIG. 1 with a cam disk instead of a cantilever.

FIG. 3 shows an alternative design of a rake system. Except for the device for lifting the control arm 8, this design is identical with the design according to FIG. 1. Insofar, reference can be made to the above description. However, instead of the cantilever, a cam disk 31 is welded to the crank axle 13, the edge of which forms a control cam 32. The control arm 8 has a contact element 33 in the form of a lift-out roller which, for lifting the control arm 8, rolls off, at least in sections, on the control cam 32. For that purpose, the control cam is designed and oriented such that the control arm 8 is lifted, when the reamer arm 11 is in its backward movement according to FIG. 1d.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A rake system with a rake, to be arranged at an angle in a channel, and a reamer, comprising:
 a reamer arm for conveying raked material to a discharge edge,
 a pivot axle, above the rake, around which the reamer arm is suspended in a swinging manner,
 a first actuating device by which the reamer arm is displaceable in backward and forward movements along the rake, and
 a reamer element at a distal end of the reamer arm which faces the rake,
 wherein the reamer element is caused to run on the rake during the forward movement and to run at a distance from the rake during the backward movement,
 wherein the reamer arm is suspended on a distal end of a control arm, which is pivotably mounted on its proximal end,
 wherein, for swiveling the control arm, a second actuating device at least at times engages at the control arm,
 wherein the first and second actuating devices are coupled with one another such that movements of the control arm and the reamer arm are synchronized, and wherein the second actuating device does not engage with the control arm during the forward movement of the reamer arm.

2. The rake system according to claim 1, wherein the first and second actuating devices have a motorized drive.

3. The rake system according to claim 1, further comprising a crank axle connected with the reamer arm by a tension element mounted eccentrically with regard to the crank axle.

4. The rake system according to claim 3, further comprising a cantilever that protrudes from the crank axle and that can bear against the control arm with its distal end.

5. The rake system according to claim 3, further comprising a cam disk attached to the crank axle, wherein an edge of the cam disk forms a control cam, and the control arm has a contact element which can bear against the control cam.

6. The rake system according to claim 1, wherein a pivot axle of the control arm is located approximately above an upper end of the rake and extends in the horizontal direction over the rake, and wherein the crank axle is located below the control arm and, as seen looking in the direction of the forward movement, behind the reamer arm.

7. The rake system according to claim 3, wherein a pivot axle of the control arm is located in a housing, which consists of two sides extending parallel to the control and reamer arms, and wherein the housing is positioned above the upper end of the rake by height-adjustable supports.

8. The rake system according to claim 1, further comprising a slider pivotably held in the housing that can bear against the reamer element.

9. The rake system according to claim 7, further comprising a motor-transmission unit for operating the crank axle arranged on a side of the housing.

10. The rake system according to claim 1, wherein a receiving groove, having a closed floor, is connected via an interruption-free transition to the upper end of the rake, wherein said receiving groove contains a screw conveyor, and wherein the interruption-free transition forms a discharge edge for the raked material and an overflow edge for press water generated in the receiving groove by the screw conveyor.

* * * * *